US008265011B2

(12) United States Patent
Sugar et al.

(10) Patent No.: US 8,265,011 B2
(45) Date of Patent: Sep. 11, 2012

(54) HIGH RESOLUTION WIRELESS INDOOR POSITIONING SYSTEM FOR LEGACY STANDARDS-BASED NARROWBAND MOBILE RADIOS

(75) Inventors: Gary L. Sugar, San Francisco, CA (US); Chandra Vaidyanathan, Rockville, MD (US); Yohannes Tesfai, Silver Spring, MD (US)

(73) Assignee: Diani Systems, Inc., Ijamsville, MD (US)

( * ) Notice: Subject to any disclaimer, the term of this patent is extended or adjusted under 35 U.S.C. 154(b) by 0 days.

(21) Appl. No.: 13/355,557

(22) Filed: Jan. 22, 2012

(65) Prior Publication Data

US 2012/0120834 A1 May 17, 2012

Related U.S. Application Data

(63) Continuation-in-part of application No. 13/286,649, filed on Nov. 1, 2011, now Pat. No. 8,179,816.

(60) Provisional application No. 61/435,269, filed on Jan. 22, 2011.

(51) Int. Cl.
*H04W 4/00* (2009.01)

(52) U.S. Cl. ..... 370/328; 375/148; 375/260; 455/456.1; 455/456.2

(58) Field of Classification Search .................. 370/328, 370/338; 375/130, 148, 260; 455/456.1, 455/456.2

See application file for complete search history.

(56) References Cited

U.S. PATENT DOCUMENTS

| | | | | |
|---|---|---|---|---|
| 4,937,822 | A | 6/1990 | Weddle et al. | |
| 7,215,698 | B2 | 5/2007 | Darby et al. | |
| 2005/0050130 | A1 | 3/2005 | Dabak et al. | |
| 2006/0125690 | A1 * | 6/2006 | Goren et al. | 342/387 |
| 2006/0142004 | A1 * | 6/2006 | He et al. | 455/434 |
| 2007/0140163 | A1 * | 6/2007 | Meier et al. | 370/329 |
| 2008/0320108 | A1 * | 12/2008 | Murty et al. | 709/220 |
| 2009/0046792 | A1 | 2/2009 | Xu et al. | |
| 2009/0257426 | A1 * | 10/2009 | Hart et al. | 370/350 |
| 2011/0188389 | A1 | 8/2011 | Hedley et al. | |

(Continued)

FOREIGN PATENT DOCUMENTS

WO WO2009143559 A1 12/2009

OTHER PUBLICATIONS

Saberinia et al, "Enhanced Localization in Wireless Personal Area Networks", IEEE Comm. Soc. Globecomm 2004.

(Continued)

*Primary Examiner* — Jung Park

(74) *Attorney, Agent, or Firm* — John R. Kasha; Kasha Law LLC

(57) ABSTRACT

Two or more data packets transmitted through a wireless channel are received using a receiver device. The two or more data packets are a result of two or more transmissions that are made sequentially in time at different center frequencies in order to span a desired bandwidth. Each data packet of the two or more data packets is transmitted at a single center frequency. Time differences and/or carrier phase differences among the two or more transmissions are estimated. A time-of-arrival of one or more data packets of the two or more data packets is calculated using each data packet of the two or more data packets and one or more of the estimated time differences, the different center frequencies, and the estimated carrier phase differences.

23 Claims, 6 Drawing Sheets

START

RECEIVE TWO OR MORE DATA PACKETS TRANSMITTED THROUGH A WIRELESS CHANNEL USING A RECEIVER DEVICE, WHEREIN THE TWO OR MORE DATA PACKETS ARE A RESULT OF TWO OR MORE TRANSMISSIONS THAT ARE MADE SEQUENTIALLY IN TIME AT DIFFERENT CENTER FREQUENCIES IN ORDER TO SPAN A DESIRED BANDWIDTH, AND WHEREIN EACH DATA PACKET OF THE TWO OR MORE DATA PACKETS IS TRANSMITTED AT A SINGLE CENTER FREQUENCY — 810

ESTIMATE TIME DIFFERENCES AMONG THE TWO OR MORE TRANSMISSIONS AND/OR CARRIER PHASE DIFFERENCES AMONG THE TWO OR MORE TRANSMISSIONS — 820

CALCULATE A TIME-OF-ARRIVAL OF ONE OR MORE DATA PACKETS OF THE TWO OR MORE DATA PACKETS USING EACH DATA PACKET OF THE TWO OR MORE DATA PACKETS AND ONE OR MORE OF THE ESTIMATED TIME DIFFERENCES, THE DIFFERENT CENTER FREQUENCIES, AND THE ESTIMATED CARRIER PHASE DIFFERENCES — 830

END

800

U.S. PATENT DOCUMENTS

2011/0286505 A1 11/2011 Hedley et al.
2011/0301912 A1 * 12/2011 Pandey et al. ................. 702/150

OTHER PUBLICATIONS

Xu et al, "High-Resolution TOA Estimation with Multi-Band OFDM UWB Signals", ICC 2008.
Berger et al, "Precise timing for multiband OFDM in a UWB system", 2006 International Conference on Ultra-Wideband.
Fleury et al, "Channel Parameter Estimation in Mobile Radio Environments Using the SAGE Algorithm"IEEE Journal on Selected Areas in Communications, vol. 17, No. 3, Mar. 1999.
Dardari et al, "Improved lower bounds on time-of-arrival estimation error in UWB realistic channels" 2006.
Guvenc et al, "Ultra-wideband range estimation: theoretical Limits and Practical Algorithms" ACM Transaction on Graphics, Oct. 2008.
ECMA-368, PHY and MAC/PHY Interface spec for MB-OFDM, 3rd Edition / Dec. 2008.
ECMA-369, PHY and MAC/PHY Interface spec for MB-OFDM, 3rd Edition / Dec. 2008.

* cited by examiner

Spectral and temporal characteristics for ECMA-368/MB-OFDM packets.

Spectral and temporal characteristics for TF-W8 packets.

200

HIGH RESOLUTION WIRELESS INDOOR POSITIONING SYSTEM FOR LEGACY STANDARDS-BASED NARROWBAND MOBILE RADIOS

CROSS-REFERENCE TO RELATED APPLICATION

This application is a continuation-in-part application of U.S. patent application Ser. No. 13/286,649, filed Nov. 1, 2011 (the "'649 application") and claims the benefit of U.S. Provisional Patent Application No. 61/435,269 filed Jan. 22, 2011. The '649 application claims the benefit of U.S. Provisional Patent Application No. 61/409,123 filed Nov. 2, 2010 and U.S. Provisional Patent Application No. 61/421,641 filed Dec. 10, 2010. All of the above mentioned applications are incorporated by reference herein in their entireties.

INTRODUCTION

The '649 application describes a method for high-resolution channel sounding that can be used to combat multipath in indoor wireless time-of-flight-based positioning systems. Using this technique, referred to herein as Time-Frequency Offset Wideband (TF-WB) signaling, a transmitter device sends a sequence of narrowband packets to a receiver device at different times and frequencies in order to span a desired bandwidth, where it is assumed that the time, frequency and carrier phase differences among the signal transmissions are known to the receiver. The receiver listens for the transmissions at the known times and frequencies while digitizing and storing them for post-processing, then uses the stored receive signals and the known time, frequency and carrier phase differences to obtain a high-resolution time-of-arrival estimate of the received signals at its antenna.

Although it enjoys significant advantages over state-of-the-art wideband and ultra-wideband signaling systems, the technique described in the '649 application requires both transmit and receive devices to have knowledge of TF-WB and to collaborate in order to make it work. Since there are literally billions of wireless devices shipped each year, there is a clear motivation to require only one side of the link—the network side—to have this knowledge.

BRIEF DESCRIPTION OF THE DRAWINGS

The skilled artisan will understand that the drawings, described below, are for illustration purposes only. The drawings are not intended to limit the scope of the present teachings in any way.

Figure 1:
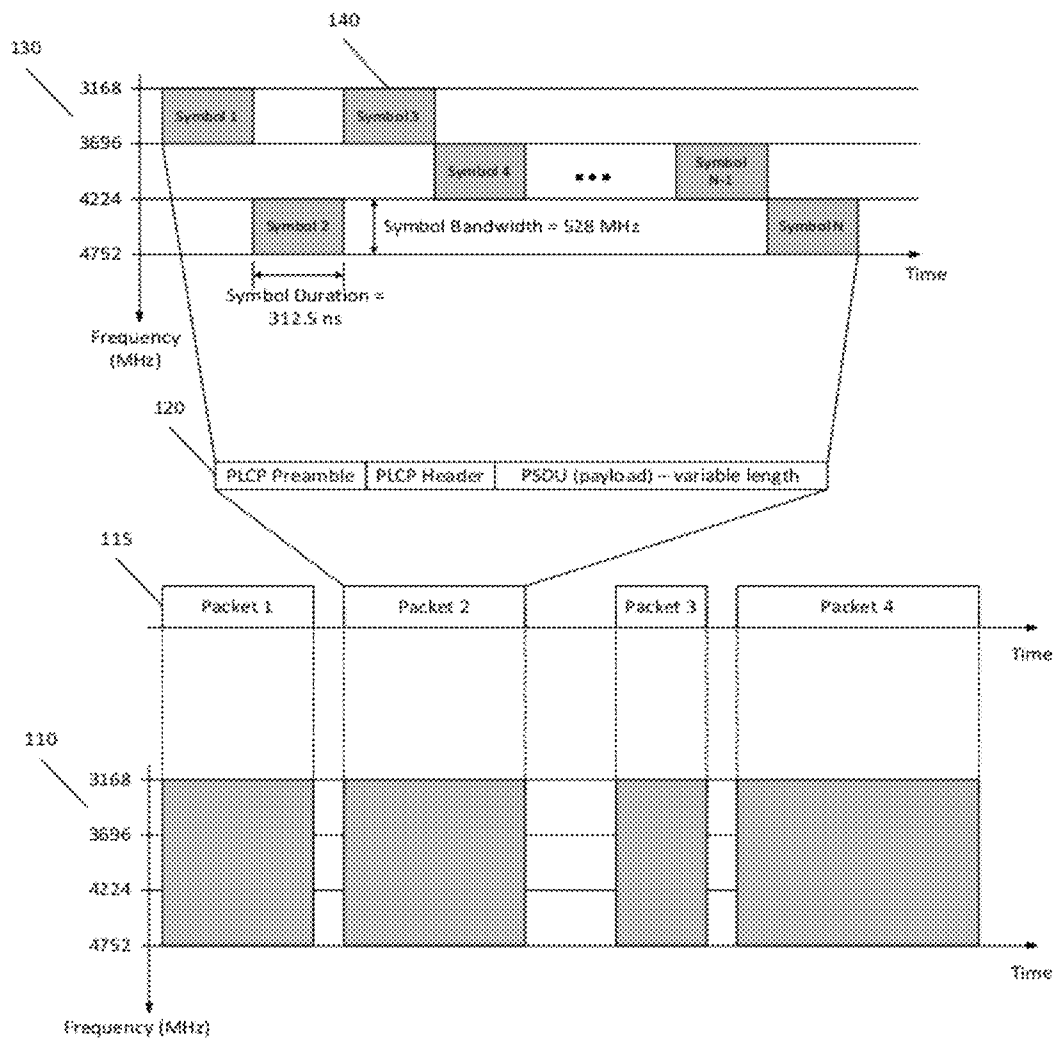
FIG. 1 shows spectral and temporal characteristics of MB-OFDM.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Time/frequency offset wideband (TF-WB) signaling is described in the '649 application, which is incorporated by reference herein in its entirety. TF-WB is a technique that allows the time-of-arrival (ToA) of multiple narrowband signals sent sequentially in time and at different center frequencies to be calculated with the same accuracy as a wideband signal spanning the same bandwidth. Although there are other known protocols such as Multi-band OFDM (also referred to as MB-OFDM or ECMA-368, an ultra-wideband or UWB standard) that use a similar means of generating wideband signals to facilitate high-resolution ToA estimates, a key advantage TF-WB provides over such techniques is that TF-WB is designed specifically to be used with pre-existing wireless standards such as IEEE 802.11/WiFi, Bluetooth, GSM/GPRS/EDGE, CDMA, etc. Techniques like those prescribed by MB-OFDM, on the other hand, require very specific changes to the physical layer representation of each data packet and as such cannot be applied more generally to other wireless standards. These conceptual differences are illustrated in FIGS. 1 and 2, which show the physical layer characteristics of MB-OFDM and TF-WB, respectively.

FIG. 1 highlights the spectral and temporal characteristics 100 of MB-OFDM. With MB-OFDM, each data packet 120 is transmitted as a sequence of OFDM symbols 140 that are frequency-hopped across a bandwidth that is three times as wide as that of an OFDM symbol. Since each packet 115 spans the entire 3× bandwidth as shown in plots 110 and 130, an optimal ToA estimate can be obtained by receiving only one packet. Very little is gained by receiving additional packets. With MB-OFDM, the "narrowband signals transmitted sequentially in time and at different center frequencies" are the OFDM symbols 140 that comprise each of its data packets 115.

Figure 2:
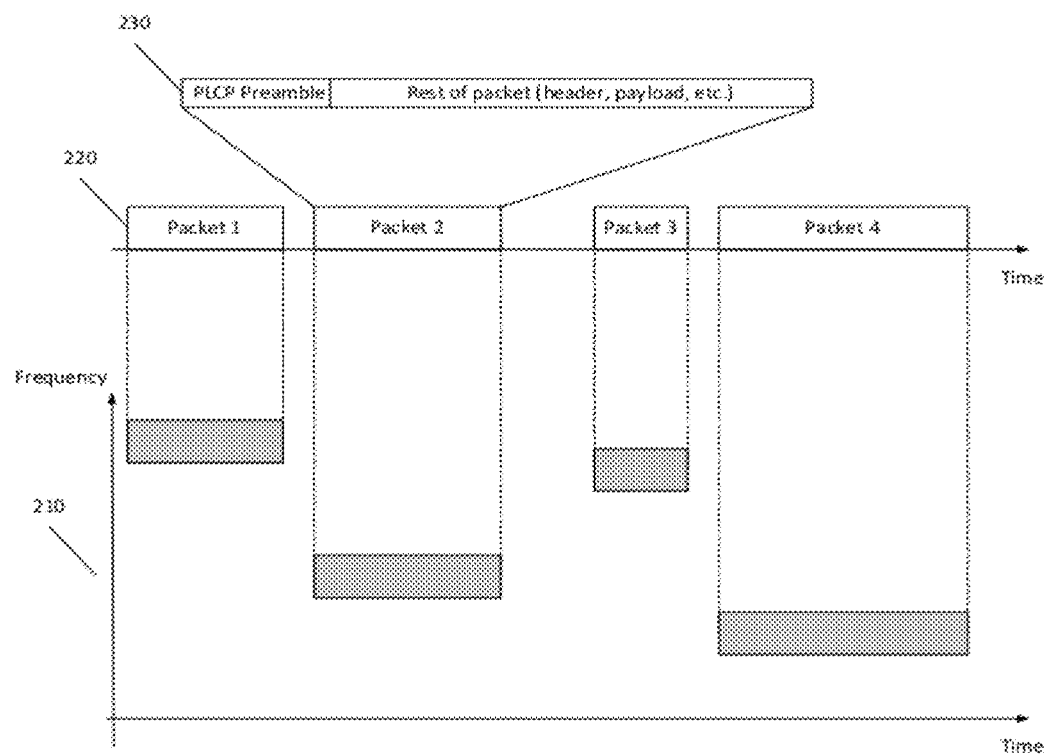
FIG. 2 shows spectral and temporal characteristics of TF-WB, in accordance with various embodiments.

FIG. 2 highlights the spectral and temporal characteristics 200 of TF-WB, in accordance with various embodiments. With TF-WB the "narrowband signals" are the data packets themselves, and frequency hopping is used between packets, as shown in plot 210—not during each packet as with MB-OFDM, as shown in plot 130 of FIG. 1. Returning to FIG. 2, TF-WB allows each data packet to be transmitted in its entirety at a fixed frequency using any desired modulation scheme—to accommodate pre-existing wireless standards. Also to accommodate pre-existing standards, TF-WB allows for arbitrary (not necessarily uniformly or precisely spaced) time differences between the data packets 220. MB-OFDM, on the other hand, demands fixed, uniformly and precisely spaced time-differences between the OFDM symbols 140 of FIG. 1. Finally, MB-OFDM demands each of the OFDM symbols to be transmitted using the same carrier phase. TF-WB, on the other hand, allows each of its data packets to be transmitted with arbitrarily different carrier phases—again to accommodate pre-existing standards (most of these standards don't require the carrier phase to remain constant over different transmit frequencies).

In summary, unlike other known methods of transmitting multiple narrowband signals sequentially in time and at different center frequencies to improve TOA accuracy, TF-WB allows data packets to be transmitted at fixed center frequencies and with arbitrary time and carrier phase offsets. These key differences come from its being designed specifically to facilitate high-resolution TOA measurements using pre-existing wireless protocols.

In various embodiments, legacy time/frequency offset wideband (LTF-WB) signaling allows a network of wireless receivers to locate a mobile transmitter using TF-WB signaling techniques without requiring the mobile to know anything about TF-WB, or even that it's being located. LTF-WB allows, for example, a network of LTF-WB-capable IEEE 802.11 WiFi Access Points to locate any WiFi mobile device—even if it doesn't support TF-WB per se.

While the techniques described herein can be applied to a broad class of wireless protocols (including cellular, 3G, WiMax, etc), the following examples relate to the IEEE 802.11 Wireless LAN (WiFi) standard.

System Overview

Figure 3:
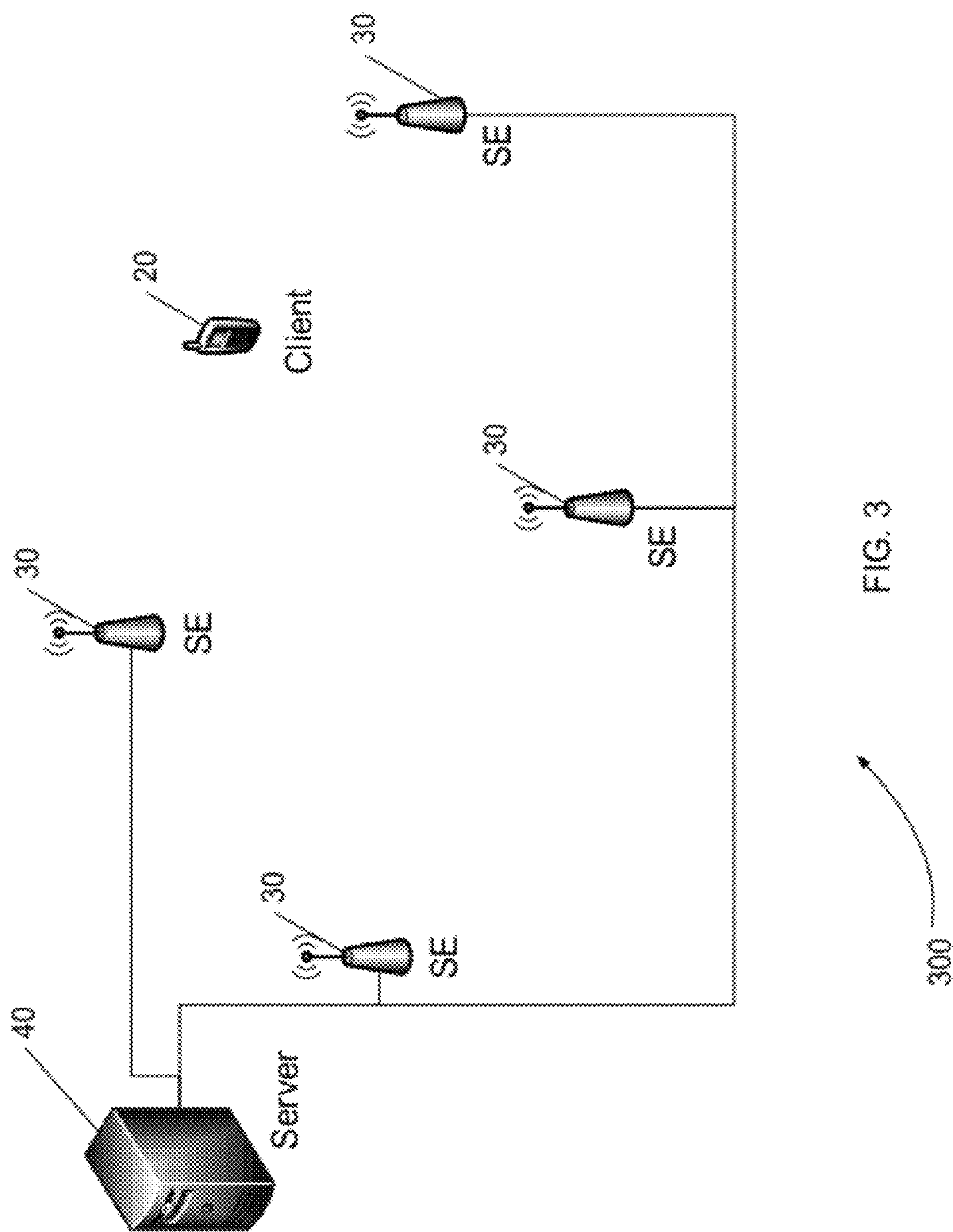
FIG. 3 is a block diagram of a time-of-flight (ToF)-based positioning system, in accordance with various embodiments.

FIG. 3 is a block diagram of a ToF-based positioning system 300, in accordance with various embodiments. System 300 includes a mobile Client device 20, a plurality of sensor/emitter (SE) devices 30 and a Server 40. Client device 20 is typically a battery-powered mobile device such as a smartphone or a laptop computer containing a wireless communication chipset that complies with a wireless standard, which for the purposes of this discussion we will assume to be IEEE 802.11/WiFi.

SE devices 30, typically the size of a WiFi Access Point (AP), are placed in various known positions in an indoor environment such as a hospital, retail store or a shopping mall. A primary function of SE devices 30 is to measure the ToAs of LTF-WB transmissions received from Client device 20 in order to estimate its position. All SE devices 30 in a network are coarsely time synchronized to a common time base in order to simultaneously receive, digitize, and store incoming transmissions from Client device 20. SE devices 30 also perform 802.11 transmit functions in order to spoof the Client devices 20, as is discussed below.

Server 40 is used to control the behavior of the Client devices 20 and SE devices 30 during the ToA measurements and to estimate the position u of Client device 20 based on ToA measurements received from the SE devices 30 by solving $$\hat{u} = \underset{u}{\operatorname{argmin}} \; \min_{t} \sum_{n=1}^{N} \| |u - u_n| - c(t_n - t) \|^2,$$

where $u_n$ is the known [x y z] position of the nth SE, c is the speed of light, $t_n$ is the nth SE's ToA estimate, and t is the unknown transmission time of the Client's LTF-WB location signal.

As described in the '649 application, the basic steps for TF-WB transmission, reception, and TOA estimation are as follows:

1. Transmitter sends a sequence of narrowband signals at different times and frequencies to the receiver. It is assumed that the time, frequency and carrier phase differences among the signal transmissions are known to the receiver.
2. Receiver listens for the transmissions at the known times and frequencies while digitizing and storing them for post-processing.
3. Receiver uses the stored receive signals and the known time, frequency and carrier phase differences of the transmissions to obtain a high-resolution estimate of the time-of-arrival of the received signals at its antenna.

In various embodiments, the steps for LTF-WB transmission, reception, and TOA estimation are as follows:

1. Receiver (i.e., the SE) spoofs the transmitter into sending a sequence of narrowband signals at different times and frequencies to the receiver by sending it a special message.
2. Transmitter (i.e., the Client) accepts the spoof directive and sends a sequence of narrowband signals at different times and frequencies to the receiver.
3. Receiver (SE) listens for the narrowband signal transmissions at the known times and frequencies while digitizing and storing them for post-processing.
4. Receiver (SE) knows the sequence of frequencies and the approximate time differences among transmissions, but in most cases does not know and must therefore estimate the specific time and carrier phase differences.
5. Receiver (SE) uses the stored receive signals, the known approximate time and frequency differences, and the estimated specific time and carrier phase differences to obtain a high-resolution estimate of the time-of-arrival of the received signals at its antenna.

In various embodiments, Client device 20 is an IEEE 802.11 WiFi Client. Methods for spoofing a WiFi Client include, but are not limited to:

1. SE sends Client an 802.11 DISASSOCIATE message, causing the Client to dissociate from the network and start an Active Scan, sending Probe Request messages on each one of its supported RF frequencies in sequence.
2. If the Client supports 802.11k, the SE could send it an 802.11k BEACON REQUEST message, causing it to respond by sending back PROBE REQUEST messages at each frequency in a set of AP-specified channels in sequence. This approach is preferred over the previous one, since in this case the Client is not forced to disassociate from the network.
3. If the Client supports 802.11v, the SE could send it an 802.11v LOCATION CONFIGURATION REQUEST message, giving the Client a list of frequencies at which to send LOCATION TRACK NOTIFICATION messages. This approach is preferred over the 802.11k approach, since it gives the SE more control over the specific set of frequencies and the time the Client spends on each frequency.

Time-of-Arrival Estimation

In various embodiments, a mathematical representation of the sequence of transmissions leaving the Client's antenna in response to the SE's spoof message is $$x(t) = \operatorname{Re}\left\{ \sum_{k=1}^{K} x_k(t - \tau_k) e^{j2\pi(f_c + f_k)t + j\phi_k} \right\}, \tag{1}$$

where Re(z) represents the real part of the complex number z, K is the number of narrowband waveforms transmitted, and $x_k(t)$ is the complex envelope of the kth narrowband waveform transmitted at time $\tau_k$, carrier frequency $f_c+f_k$ and carrier phase $\phi_k$. The transmission time $\tau_1$ of the first waveform can be assumed to be zero without loss of generality. This way, the remaining $\tau_k$ can be viewed as time offsets relative to transmit time of the first waveform. The waveform described by equation (1) above is referred to as a LTF-WB waveform.

In various embodiments, an SE device 30 uses the following high-level steps to estimate the time-of-arrival of a received, downconverted, digitized. and stored LTF-WB waveform:

1. Digitally upconverts the received narrowband observation waveforms to their known offset frequencies and sums, yielding a wideband observation waveform.
2. Synthesizes a reference waveform corresponding to each of the received narrowband observation waveforms using the known (and optionally decoded) portions of the data packets and the rules prescribed by the wireless standard.
3. Given the narrowband reference waveforms, the known offset frequencies, and a hypothetical set of the following parameters: time and carrier phase offsets between narrowband LTF-WB transmissions, channel impulse response, and channel propagation delay; defines a model to generate a "wideband model output waveform"—a most-likely guess for what the wideband observation waveform would look like given the known information and that choice of parameters.
4. Using an iterative multi-dimensional search, finds the set of parameters (time and carrier phase offsets, channel impulse response, and channel propagation delay) that most closely match the wideband model output and wideband observation waveforms.

The resulting channel propagation delay from this process is the estimated time-of-arrival.

These steps are again described in greater detail and with more mathematical rigor:

1. Digitally upconvert the received narrowband observation waveforms $y_k(nT)$ to their known offset frequencies $f_k$, yielding the wideband observation waveform $$y(nT) \triangleq \sum_{k=1}^{K} y_{k(nT)} e^{j2\pi f_k nT}$$

2. For each received narrowband observation waveform $y_k(nT)$, synthesize a corresponding narrowband reference waveform $\hat{x}_k(nT)$ by encoding and modulating known portions of the waveform (including the physical layer preamble and any known data bits) as specified by the wireless standard. The receiver may optionally choose to demodulate and decode other unknown portions of the packet and add the decoded data to the known information that gets encoded and modulated to generate the narrowband reference waveform $\hat{x}_k(nT)$ as well. If the receiver decides not to include the decoded information in the narrowband reference waveform, it sets the corresponding portions of that waveform to zero.
3. Given the narrowband reference waveforms $\hat{x}_k(nT)$, the known frequency offsets $f_k$ and a set of parameters $\{\tau_0, \phi, \tau\}$, with $\tau \triangleq [0\, \tau_2 \ldots \tau_k]^T$ and $\phi \triangleq [0\, \phi_2 \ldots \phi_K]^T$ being the time and carrier phase offsets between transmissions, respectively and $\tau_0$ being the channel propagation delay, generate a wideband reference signal defined by $$\hat{x}(nT, \tau_0, \phi, \tau) \triangleq \sum_{k=1}^{K} \hat{x}_k(nT - \tau_k - \tau_0) e^{j2\pi f_k (nT - \tau_0) + j\phi_k},$$

The first elements of the $\tau$ and $\phi$ vectors are zero because we're only interested in the timing and phase differences of the $2^{nd}$, $3^{rd}$, etc. burst relative to the first burst; we can assume therefore without loss of generality that $\tau_1 = \phi_1 = 0$. It should also be noted that with a noise and multipath-free channel and with the correct choice of candidates $\{\tau_0, \phi, \tau\}$, the wideband reference and wideband observation waveforms should be identical.

4. Find the Wiener filter that best matches the wideband reference signal $\hat{x}(nT, \tau_0, \phi, \tau)$ generated in the previous step to the wideband observation signal $y(nT)$, then filter the wideband reference signal through the Wiener filter. Mathematically speaking, the Wiener filter is given by $$h = h(\tau_0, \phi, \tau) \triangleq [R_{XX}(\tau_0, \phi, \tau)]^{-1} R_{XY}(\tau_0, \phi, \tau),$$

where $R_{XY}(\tau_0, \phi, \tau)$ is the cross correlation vector between the wideband reference and observation signals, and $R_{XX}(\tau_0, \phi, \tau)$ is the autocorrelation matrix for the wideband reference signal. Note that each candidate 2K+1-tuple $\{(\tau_0, \phi, \tau\}$ will produce a different Wiener filter h, hence the alternative notation $h(\tau_0, \phi, \tau)$ used above.

It should be noted that with a noise-free channel and with the correct choice of candidates $\{\tau_0, \phi, \tau\}$, (a) the Wiener filter output and the wideband observation waveforms should be identical, and (b) the frequency response of the channel and the Wiener filter should be identical over all active RF transmit frequencies.

5. Iteratively repeat steps 3 and 4 using various choices of $\{\tau_0, \phi, \tau\}$ to find the candidates $\{\hat{\tau}_0, \hat{\phi}, \hat{\tau}\}$ that jointly minimize the mean-square error between the Wiener filter output and the wideband observation waveform; the value of $\hat{\tau}_0$ that results from this process is the TOA estimate. This step can be written mathematically as follows:

$$\hat{\tau}_0 = \underset{\tau_0}{\operatorname{argmin}} \min_{\phi,\tau} \sum_n |y(nT) - \hat{x}(nT, \tau_0, \phi, \tau) * h(\tau_0, \phi, \tau)|^2,$$

where the asterisk in the above formula represents the convolution operator. Any one of a number of well-known multi-dimensional minimization techniques can be used to minimize the number of iterations required to find the optimal set of candidates, including the Simplex method, Newton's method, BFGS, etc.

Learning and Remembering how Different Manufacturer's Chipsets Behave

Since there are only a handful of manufacturers of WiFi chipsets, in various embodiments the behavior of each manufacturer's chipset is measured and characterized in response to the spoof messages in order to optimize the efficiency of the AP/Client exchange. For example, the order at which the Client visits the frequencies, the time it spends on each frequency, and/or the number of times it transmits at each frequency can be measured, since some of this information is not clearly specified in the 802.11 standard and left up to the Client manufacturer's discretion. This vendor-specific information could then store be stored in a database and later retrieved by the AP when it's online, using the vendor ID portion of the Client's MAC address to determine the Client manufacturer's identity.

Other useful information that could be stored in such a database includes:

1. Time offset between transmissions—the Client's time between transmissions at different frequencies can be carefully measured, and the results tabulated using a histogram. The AP could use the histogram to optimize its iterative parameter search in Step 5 above.
2. Carrier phase offsets between transmissions—the carrier phase offsets between Client transmissions at different frequencies can be measured, and the results tabulated using a histogram, stored in the database, and used to optimize the search in Step 5 as well.

Exploiting Time-of-Departure Information from Clients that Support 802.11v

The IEEE 802.11v standard supports a time-stamp mechanism in which the PHY loads the contents of a high-speed timer into the TIME-OF-DEPARTURE field of each packet immediately before transmission. In various embodiments, an LTF-WB-capable AP can decode from the packets received from the Client and subtract the time-stamps to obtain the actual time offsets, i.e., the vector r defined in Step 3 above. This removes r as an unknown from Step 5 and simplifies the search considerably. More specifically, using $\tau_{act}$ to denote the actual time differences computed by decoding and subtracting the time-stamps, the multidimensional search in Step 5 would simplify to the following (note that the minimization is now only over $\phi$ and not $\phi$ and $\tau$):

$$\hat{\tau}_0 = \underset{\tau_0}{\text{argmin}} \min_{\phi} \sum_n |y(nT) - \hat{x}(nT, \tau_0, \phi, \tau_{act}) * h(\tau_0, \phi, \tau_{act})|^2.$$

Multi-Input Receivers and Joint Time/Angle of Arrival Measurements

Nearly all IEEE 802.11n-compatible APs and some Clients are equipped with multi-input receivers, allowing them to receive, downconvert and digitize signals through up to 4 antenna paths simultaneously. In various embodiments, a multi-input receiver can be leveraged to improve the accuracy of the ToA estimates in indoor environments. The improved performance comes from having additional uncorrelated (or loosely correlated) observations of the ToA through the new antenna paths.

If a multi-input receiver is used to receive a LTF-WB signal, that receiver downconverts, digitizes, and stores each incoming narrowband transmission through each of its M antenna paths simultaneously. For ToA estimation, it computes wideband observation waveforms and Wiener filters for each antenna path, and uses the following formula to estimate the ToA, which is a generalization of the formula in Step 5 above for multiple antenna paths:

$$\hat{\tau}_0 = \underset{\tau_0}{\text{argmin}} \min_{\phi,\tau} \sum_{m=1}^{M} \sum_n \frac{|y^{\langle m \rangle}(nT) - \hat{x}(nT, \tau_0, \phi, \tau) * h^{\langle m \rangle}(\tau_0, \phi, \tau)|^2}{\sigma_m^2} \quad (2)$$

where $y^{\langle m \rangle}(nT)$ and $h^{\langle m \rangle}(\tau_0)$ are the wideband observation waveform and Wiener filters, respectively, and $\tau_m^2$ is the average noise power per sample in the mth antenna path. This can be shown to be a maximum-likelihood estimate for the ToA $\tau_0$ given the system model described herein. The estimator can be described in words as follows:

For each candidate combination of ToA, timing offsets and carrier phase offsets
- for each antenna path
  - compute the mean-square error (MSE) between the observed and model output waveforms for that candidate ToA
  - normalize the MSE by the noise power in that antenna path
- sum normalized MSEs for each antenna path Find the candidate combination of ToA, timing offsets and carrier phase offsets that produces the lowest summed MSE over all antenna paths. The ToA estimate $\hat{\tau}_0$ is the ToA element of that combination.

An alternative to the approach described above of summing the MSE's for each antenna path at each candidate TOA would be to estimate the TOA for each antenna path using steps 1-5 above (or any other technique) and combine these TOAs into a final TOA estimate by computing their mean, max, min, median, mode, etc.

It should be noted that the multi-input ToA estimator described above can be used to enhance the performance of any single-antenna path ToA estimator—not just one that uses LTF-WB signaling. In other words, for any system that transmits a known reference waveform $\hat{\tau}(nT, \tau_0)$ through a multipath additive white Gaussian noise channel with propagation delay $\tau_0$ and receives through a multi-input receiver yielding observation waveforms $y^{\langle m \rangle}(nT)$, m=1, . . . , M for each of the M antenna paths, the approach described above can be shown to provide the optimum ToA estimate.

In addition to improving the time-resolution of indoor time-of-arrival (ToA) measurements, LTF-WB can also be used to improve the accuracy of indoor angle-of-arrival (AoA) measurements as well. A multi-input receiver is required for AoA.

Figure 4:
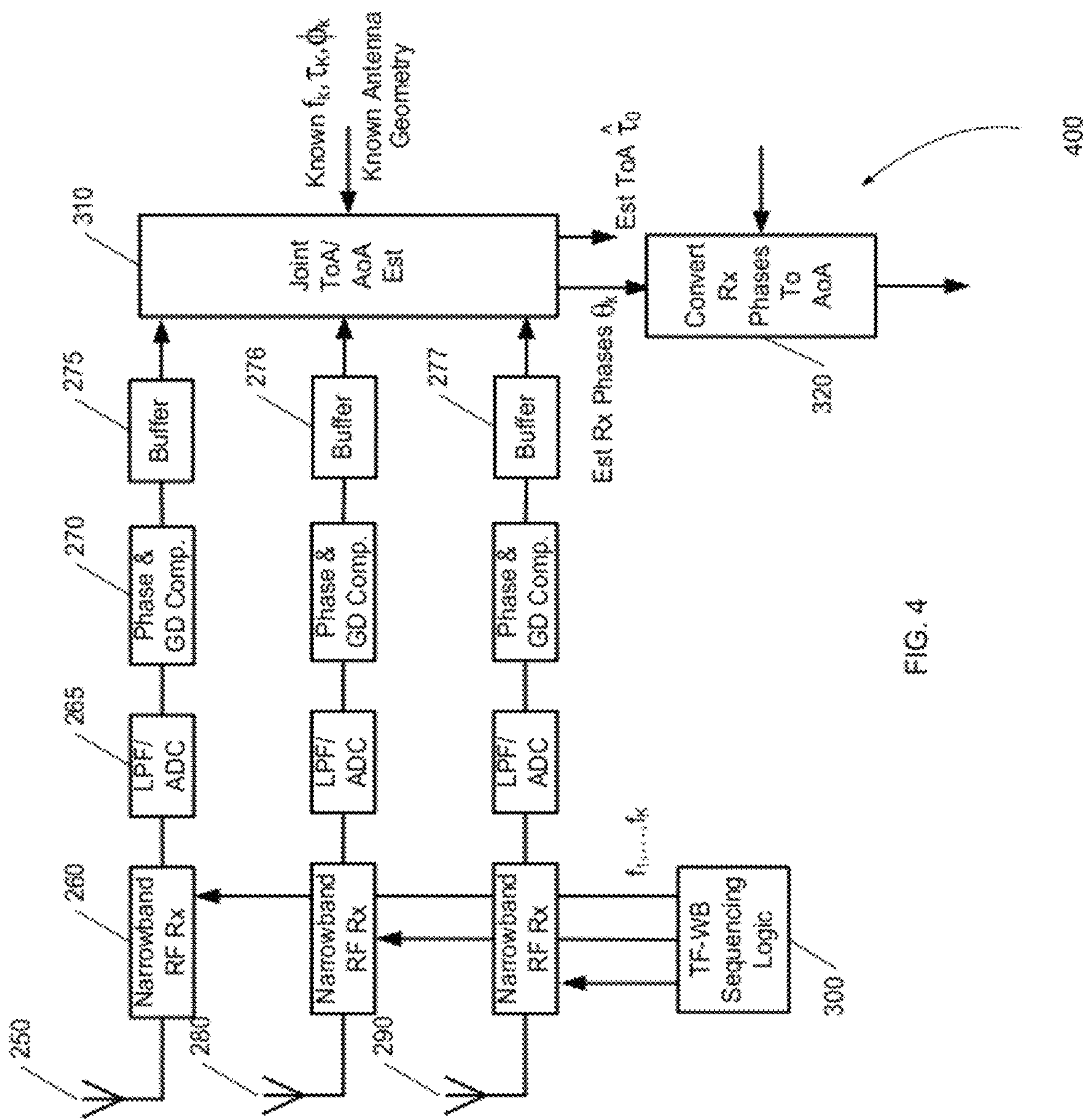
FIG. 4 is a block diagram of a 3-input TF-WB-capable receiver, in accordance with various embodiments.

FIG. 4 is a block diagram of a 3-input LTF-WB-capable receiver 400, in accordance with various embodiments. The received LTF-WB signals from each antenna path are downconverted 260, digitized 265, adjusted for gain dependent group delay and phase shift 270, and stored 275-277. To estimate the AoA 310, the ToA of the received LTF-WB signals is found first using equation (2) above, then the phase angle of the incoming transmission on each antenna path is estimated by computing the phase angle of Wiener filter at the tap corresponding to the LOS path. The three phase angles computed in this step can then be converted into an AoA estimate 320 based on the physical geometry of the antennas. The advantage of using LTF-WB signaling for the AoA measurements is multipath suppression. The high time resolution allows the Wiener filter to discriminate the LOS from other paths, so the phase angle we see is the phase of the signal coming in the direction of the LOS path only—not other paths. For lower bandwidth signals, the LOS path would be summed with multipath reflections from other paths, yielding distorted phase estimates.

Figures 5, 6, 7:
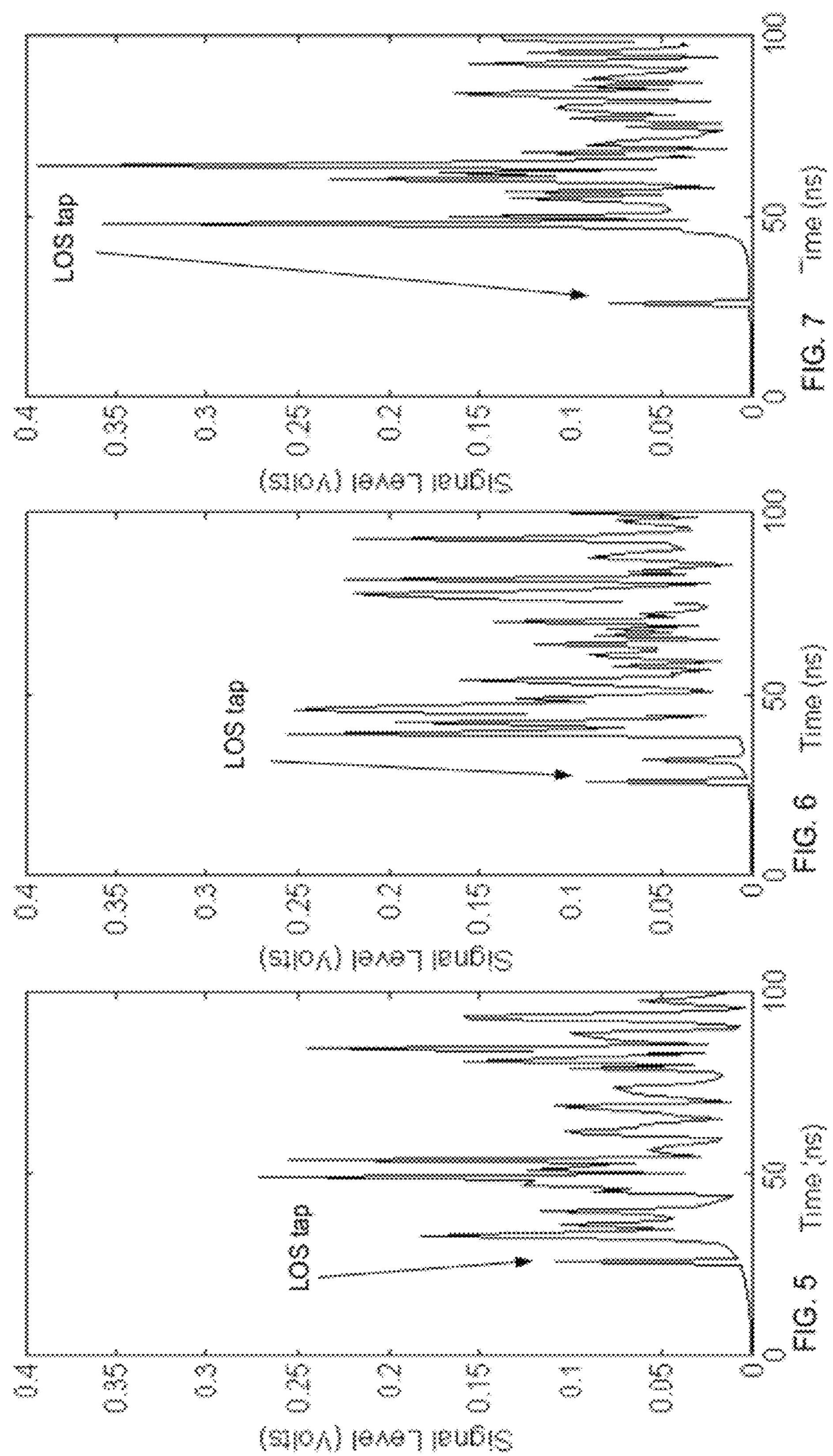
FIGS. 5-7 are exemplary plots that show Wiener filters for each of the 3 antenna paths from FIG. 4, in accordance with various embodiments.

FIGS. 5-7 are plots of signal level produced by Wiener filters for the three antenna paths of the receiver shown in FIG. 2, in accordance with various embodiments.

Alternatives to Spoofing

Instead of spoofing the client into sending an LTF-WB sequence, one may use software on the client to get it to send the sequence. For example, the operating system used on Google Android smartphones provides a function in its application programming interface (API) which when executed, causes the smartphone to perform an 802.11 Active Scan, sending 802.11 Probe Request messages on each of its supported RF frequencies in sequence. This, for example, would allow a programmer to write a Google Android application that can generate LTF-WB sequences by doing 802.11 Active Scans on command from the network. Unlike spoofing, this would obviously require a modification to the client device to support this new functionality, but the change is only in software; no hardware changes to the client are necessary. Note however that without hardware changes on the client side, the time offsets and carrier phase differences between the narrowband transmissions will not generally be available to the client software, and so will have to be estimated by the LTF- WB-enabled receiver on the network side in order to estimate the TOA of the received sequence.

Receiver Calibration

Most digital receivers use some sort of automatic gain control (AGC) to adjust their received signal level entering the analog-to-digital converter (ADC). The gain control circuit is often implemented as a set of variable gain amplifiers (VGAs) in series that can be either switched on and off depending on the value of an input gain control word. When a VGA stage is turned on vs. off, it can create a carrier phase and/or group delay change. If the receiver changes its AGC setting to receive the narrowband transmissions at different frequencies, the phase shifts and group delay changes will create distortion in the received waveforms.

Fortunately, these phase and group delay vs. Rx gain variations don't change much across time and temperature, so they can be calibrated (i.e., measured at the time of manufacturing), stored in a table, and compensated for during data digitization and data storage.

LTF-WB Receiver System

Referring to FIG. 4, a system for calculating the time-of-arrival of a wireless signal through a wireless channel includes receiver device 400. Receiver device 40 can include, but is not limited to, an access point, a smartphone, a laptop computer, or a wireless smart tag. Receiver device 1200 can include hardware, software, or a combination of hardware and software.

Receiver device 400 receives two or more data packets transmitted through a wireless channel. The two or more data packets are a result of two or more transmissions that are made sequentially in time at different center frequencies in order to span a desired bandwidth. Each data packet of the two or more data packets is transmitted at a single center frequency.

Receiver device 400 estimates time differences among the two or more transmissions and/or carrier phase differences among the two or more transmissions.

Receiver device 400 calculates a time-of-arrival of one or more data packets of the two or more data packets using each data packet of the two or more received data packets and one or more of the estimated time differences, the different center frequencies, and the estimated carrier phase differences.

The two or more data packets are different data packets, for example. In various embodiments, the two or more data packets are the same data packets.

In various embodiments, the two or more data packets conform to the IEEE 802.11 (Wi-Fi™) standard, the Bluetooth™ standard, or the Global System for Mobile Communications (GSM) standard.

In various embodiments, the two or more data packets include IEEE 802.11 Probe Request packets, path loss measurement packets, or IEEE 802.11v or Cisco CCX™ path loss measurement packets sent at different times and frequencies.

In various embodiments, receiver device 400 further calculates an angle of arrival of at least one data packet of the two or more data packets. Receiver device 400 receives the two or more data packets through two or more antenna paths 250, 280, and 290 simultaneously. Receiver device 400 estimates carrier phases of the two or more data packets received through each antenna path. Receiver device 400 converts the estimated carrier phases into an angle-of-arrival estimate.

In various embodiments, at least one additional receiver device is included that receives the two or more data packets. The at least one additional receiver device calculates an additional time-of-arrival for the two or more data packets. The time-of-arrival and the additional time-of-arrival are used to calculate a location for a device that transmitted the two or more data packets.

In various embodiments, the estimated time offsets and/or estimated carrier phase offsets and/or center frequencies of two or more data packets associated with a group of devices that share a common vendor ID in their MAC address are stored in a database. The information is later retrieved from the database using the decoded vendor IDs from the two or more data packets. The retrieved information is then used in the time-of-arrival calculation.

In various embodiments, receiver device 400 sends a spoof message before receiving the two or more data packets that causes the two or more transmissions. The spoof message includes an 802.11 DISASSOCIATE message and the two or more transmissions include PROBE REQUEST messages, for example. In various embodiments, the spoof message includes an 802.11k BEACON REQUEST message and the two or more transmissions include PROBE REQUEST messages. In various embodiments, the spoof message includes an 802.11v LOCATION CONFIGURATION REQUEST message that provides the different center frequencies and the two or more transmissions include LOCATION TRACK NOTIFICATION messages.

In various embodiments, receiver device 400 further receives two or more calibration data packets before receiving the two or more data packets. Receiver device 400 uses the two or more calibration data packets to construct a calibration table. The calibration table stores measured changes in group delay and phase shift over a set of receiver gain settings and/or RF center frequencies. Receiver device 400 later uses the calibration table contents in time-of-arrival and/or angle-of-arrival calculations.

In various embodiments, the two or more data packets are 802.11v data packets that include time-stamps. Receiver device 400 uses differences among the time-stamps as the estimated time differences.

In various embodiments, the two or more data packets are received simultaneously through a plurality of antenna paths 250, 280, and 290. A time-of-arrival is calculated for each antenna path producing a plurality of time-of-arrival values. The plurality of time-of-arrival values are combined into a final time-of-arrival estimate.

In various embodiments, the two or more data packets are received simultaneously through a plurality of antenna paths 250, 280, and 290. The steps of estimating and calculating are based on received data packets from each antenna path of the plurality of antenna paths.

In various embodiments, receiver device 400 sends a message to a transmitter device (not shown) before receiving the two or more data packets causing application software running in the transmitter device to perform an 802.11 Active Scan. The transmitter device is a smartphone and the application software is an application running on the smartphone operating system, for example.

LTF-WB Receiver Method

Figure 8:
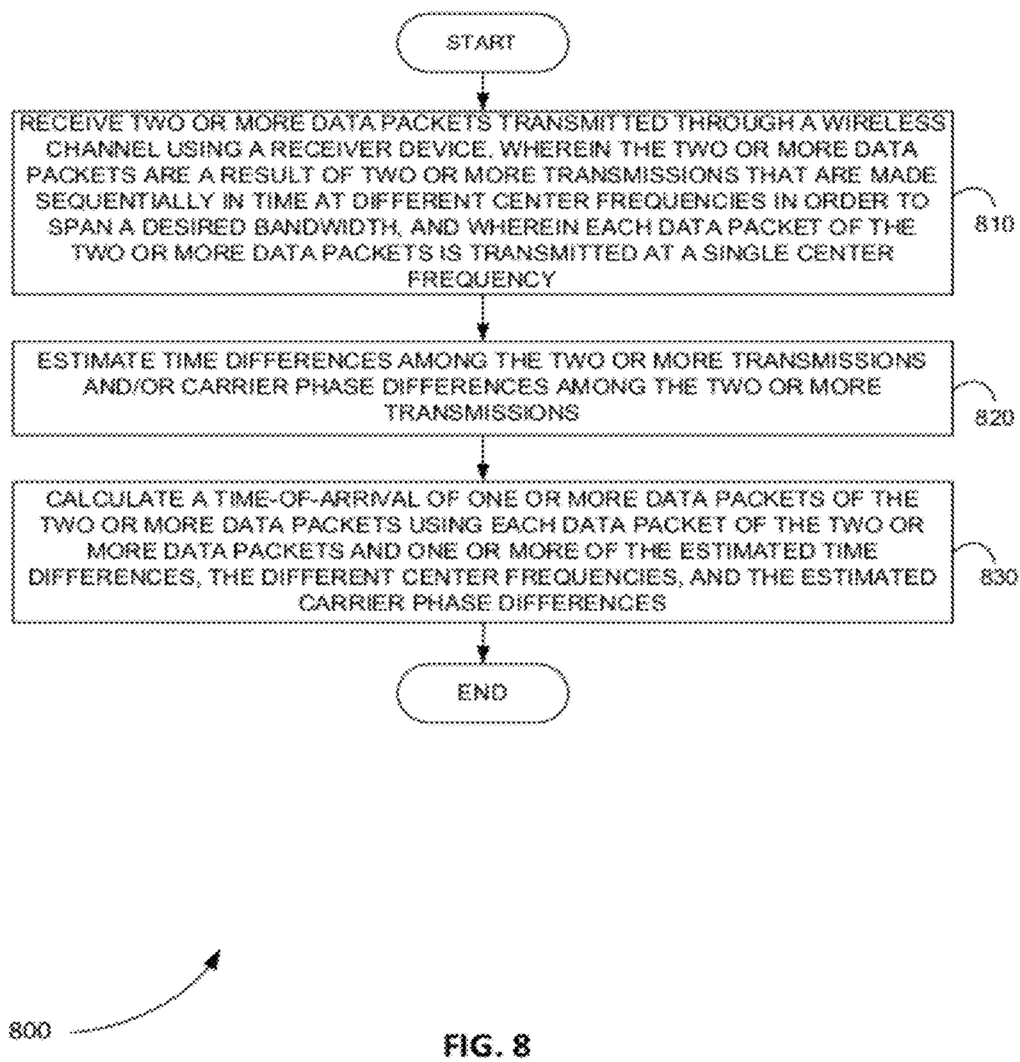
FIG. 8 is an exemplary flowchart showing a method for calculating the time-of-arrival of a wireless signal through a wireless channel using a receiver device, in accordance with various embodiments.

FIG. 8 is an exemplary flowchart showing a method 800 for calculating the time-of-arrival of a wireless signal through a wireless channel using a receiver device, in accordance with various embodiments.

In step 810 of method 800, two or more data packets transmitted through a wireless channel are received using a receiver device. The two or more data packets are a result of two or more transmissions that are made sequentially in time at different center frequencies in order to span a desired bandwidth. Each data packet of the two or more data packets is transmitted at a single center frequency.

In step 820, time differences among the two or more transmissions and/or carrier phase differences among the two or more transmissions are estimated.

In step 830, a time-of-arrival of one or more data packets of the two or more data packets is calculated using each data packet of the two or more data packets and one or more of the estimated time differences, the different center frequencies, and the estimated carrier phase differences.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for calculating the time-of-arrival of a wireless signal through a wireless channel, comprising:

a receiver device that receives two or more data packets transmitted through a wireless channel, wherein the two or more data packets are a result of two or more transmissions that are made sequentially in time at different center frequencies in order to span a desired bandwidth, wherein each data packet of the two or more data packets is transmitted at a single center frequency, and wherein the two or more received data packets represent narrowband signals that span the same desired bandwidth as a wideband signal, estimates time differences among the two or more transmissions and/or carrier phase differences among the two or more transmissions, and calculates a time-of-arrival of any one of the two or more data packets using each of the two or more received data packets and one or more of the estimated time differences, the different center frequencies, and the estimated carrier phase differences, wherein using each of the data packets of the two or more received data packets in the calculation allows the time of arrival to be calculated with the same accuracy as a wideband signal that spans the same bandwidth as the two or more received data packets.

2. The system of claim 1, wherein the two or more data packets are different data packets.

3. The system of claim 1, wherein the two or more data packets are the same data packets.

4. The system of claim 1, wherein the two or more data packets conform to the IEEE 802.11 (Wi-Fi™) standard.

5. The system of claim 4, wherein the two or more data packets comprise IEEE 802.11 Probe Request packets sent at different times and frequencies.

6. The system of claim 1, wherein the two or more data packets comprise path loss measurement packets sent at different times and frequencies.

7. The system of claim 4, wherein the two or more data packets comprise IEEE 802.11v or Cisco CCX™ path loss measurement packets sent at different times and frequencies.

8. The system of claim 1, wherein the two or more data packets conform to the Bluetooth™ standard.

9. The system of claim 1, wherein the two or more data packets conform to the Global System for Mobile Communications (GSM) standard.

10. The system of claim 1, wherein the receiver device calculates an angle of arrival of at least one data packet of the two or more data packets by receiving the two or more data packets through two or more antenna paths simultaneously, estimating carrier phases of the two or more data packets received through each antenna path, and converting the estimated carrier phases into an angle-of-arrival estimate.

11. The system of claim 1, further comprising at least one additional receiver device that receives the two or more data packets and calculates an additional time-of-arrival for the two or more data packets, wherein the time-of-arrival and the additional time-of-arrival are used to calculate a location for a device that transmitted the two or more data packets.

12. The system of claim 1, further comprising storing in a database the estimated time offsets and/or estimated carrier phase offsets and/or center frequencies of two or more data packets associated with a group of devices that share a common vendor ID in their MAC address, and later retrieving the information from the database using the decoded vendor IDs from the two or more data packets, then using the retrieved information in the time-of-arrival calculation.

13. The system of claim 1, wherein the receiver device sends a spoof message before receiving the two or more data packets that causes the two or more transmissions.

14. The system of claim 13, wherein the spoof message comprises an 802.11 DISASSOCIATE message and the two or more transmissions comprise PROBE REQUEST messages.

15. The system of claim 13, wherein the spoof message comprises an 802.11k BEACON REQUEST message and the two or more transmissions comprise PROBE REQUEST messages.

16. The system of claim 13, wherein the spoof message comprises an 802.11v LOCATION CONFIGURATION REQUEST message that provides the different center frequencies and the two or more transmissions comprise LOCATION TRACK NOTIFICATION messages.

17. The system of claim 1, wherein the receiver device further receives two or more calibration data packets before receiving the two or more data packets, wherein the receiver device uses the two or more calibration data packets to construct a calibration table that stores measured changes in group delay and phase shift over a set of receiver gain settings and/or RF center frequencies, and the receiver device later uses the calibration table contents in time-of-arrival and/or angle-of-arrival calculations.

18. The system of claim 1, wherein the two or more data packets are 802.11v data packets that include time-stamps and the receiver device uses differences among the time-stamps as the estimated time differences.

19. The system of claim 1, wherein the two or more data packets are received simultaneously through a plurality of antenna paths, wherein a time-of-arrival is calculated for each antenna path producing a plurality of time-of-arrival values and the plurality of time-of-arrival values are combined into a final time-of-arrival estimate.

20. The system of claim 1, wherein the two or more data packets are received simultaneously through a plurality of antenna paths, and wherein the steps of estimating and calculating are based on received data packets from each antenna path of the plurality of antenna paths.

21. The system of claim 1, where the receiver device sends a message to a transmitter device before receiving the two or more data packets causing application software running in the transmitter device to perform an 802.11 Active Scan.

22. The system of claim 21, wherein the transmitter device includes a smartphone and the application software includes an application running on the smartphone operating system.

23. A method for calculating the time-of-arrival of a wireless signal through a wireless channel, comprising:

receiving two or more data packets transmitted through a wireless channel using a receiver device, wherein the two or more data packets are a result of two or more transmissions that are made sequentially in time at different center frequencies in order to span a desired bandwidth, wherein each data packet of the two or more data packets is transmitted at a single center frequency, and wherein the two or more received data packets represent narrowband signals that span the same desired bandwidth as a wideband signal;

estimating time differences among the two or more transmissions and/or carrier phase differences among the two or more transmissions; and calculating a time-of-arrival of any one of the two or more data packets using each of the two or more data packets and one or more of the estimated time differences, the different center frequencies, and the estimated carrier phase differences, wherein using each of the data packets of the two or more received data packets in the calculation allows the time of arrival to be calculated with the same accuracy as a wideband signal that spans the same bandwidth as the two or more received data packets.

* * * * *